May 2, 1967   T. J. O'CONNOR   3,316,649

GAGE

Filed Aug. 17, 1964

INVENTOR.
THOMAS J. O'CONNOR
BY Whittemore,
Hulbert & Belknap
ATTORNEYS

United States Patent Office 3,316,649
Patented May 2, 1967

3,316,649
GAGE
Thomas J. O'Connor, Ann Arbor, Mich., assignor of one-half to Dale R. Smith, Detroit, Mich.
Filed Aug. 17, 1964, Ser. No. 389,845
8 Claims. (Cl. 33—178)

The invention relates to gages and refers more specifically to structure for measuring the internal diameter of cylindrical openings and the like including unique anti-backlash structure.

In the past it has been customary to measure the internal diameter of pipes, tubes, cylindrical openings and the like through the use of apparatus, such as air gages, internal calipers and the like. Prior apparatus for measuring interval diameters have been deficient in that they usually require exact alignment within the opening to be measured which alignment must be manually maintained. Further, known internal diameter measuring devices are relatively complicated and expensive and in addition often inaccurate due to structure allowing backlash.

It is therefore one of the objects of the present invention to provide improved gage structure for measuring the internal diameter of cylindrical openings.

Another object is to provide gage structure for measuring the internal diameter of cylindrical openings including improved anti-backlash structure.

Another object is to provide improved anti-backlash structure.

Another object is to provide a gage for measuring the internal diameter of cylindrical openings or the like which is self-aligning in an opening the diameter of which is to be measured.

Another object is to provide a gage for determining the diameter of cylindrical openings or the like including a plurality of balls positioned in an annular race, means for holding the balls in the annular race while allowing radial movement thereof, apparatus for forcing the balls radially outwardly of the race into engagement with the surface of the opening, and means for indicating the distance between the portion of opposed balls in contact with the surface of the opening.

Another object is to provide structure as set forth above wherein the annular race is formed by a pair of cylindrical members positioned in axial alignment adjacent each other having opposed beveled edges on the ends thereof in engagement with the balls.

Another object is to provide structure as set forth above wherein the means for holding the balls in the race comprises a cylindrical sleeve having radially extending openings therethrough of smaller diameter than the balls.

Another object is to provide structure as set forth above wherein the means for forcing the balls outward of the race comprises means for moving the cylindrical members axially toward each other.

Another object is to provide structure as set forth above wherein the means for moving the cylindrical members toward each other comprises a shaft having a helical portion secured to one of the members with the helical portion thereof passing through a complementary helical member in the other member.

Another object is to provide structure as set forth above wherein the means for indicating the distance between the portion of opposed balls in contact with the surface of the opening comprises means for indicating the amount of rotation of the shaft from a predetermined position thereof relative to the other member.

Another object is to provide structure as set forth above and further including anti-backlash structure operable in conjunction with the helical portion of the shaft.

Another object is to provide anti-backlash structure including a pair of nut members through which a helical shaft is threaded and means for adjustably biasing one of the nut members radially into contact with the other.

Another object is to provide anti-backlash structure as set forth above wherein the biasing means comprises a spring engaging one of the nuts to provide a torque thereon about the axis of the shaft extending therethrough.

Another object is to provide gage structure as set forth above which is simple in construction, economical to manufacture and efficient in use.

Other objects and features of the invention will become apparent as the description proceeds, especially when taken in conjunction with the accompanying drawing, illustrating a preferred embodiment of the invention, wherein.

Figure 1:
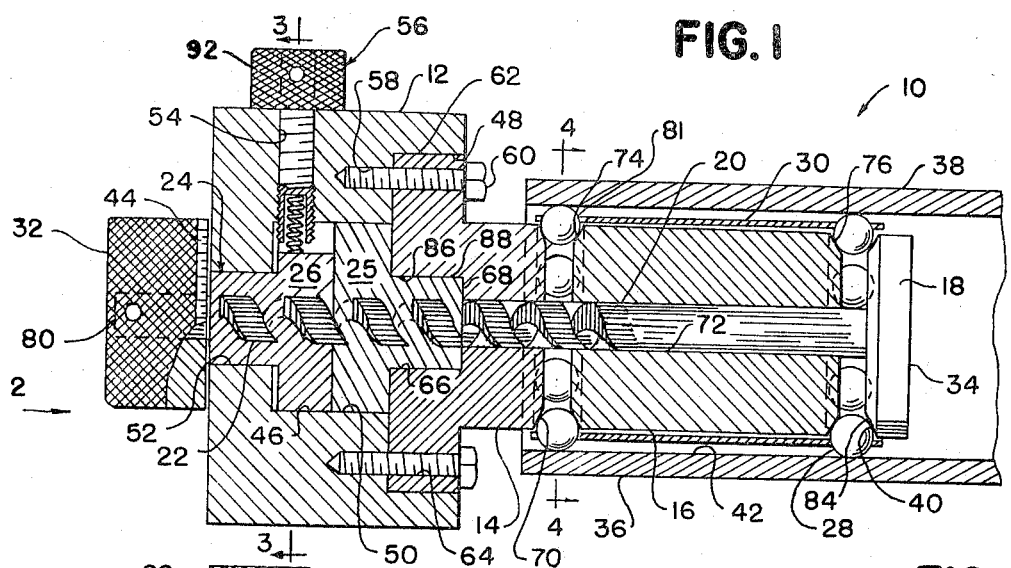
FIGURE 1 is a longitudinal section view of gage structure constructed in accordance with the invention.
Figure 2:
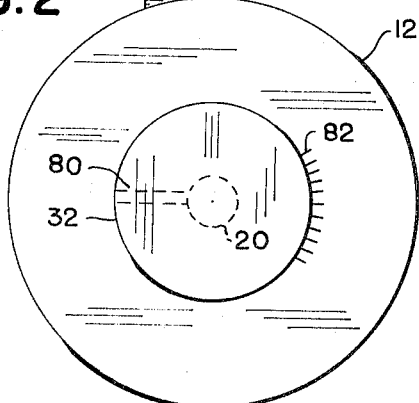
FIGURE 2 is an end view of the gage structure illustrated in FIGURE 1 taken in the direction of arrow 2 in FIGURE 1.

With particular reference to the figures of the drawing, one embodiment of the present invention will now be considered in detail.

As shown best in FIGURE 1, the gage 10 includes the housing 12, base 14, spacing sleeve 16, and pressure plate 18, assembled as shown. The pressure plate 18 is rigidly secured to the shaft 20, the end 22 of which is helical and passes through the anti-backlash nuts 25 and 26. Gage 10 further includes the balls 28 held between the pressure plate 18, sleeve 16 and base 14 by the retaining sleeve 30.

In operation, on rotation of the calibrated dial 32 with the end 34 of the gage 10 inserted within the end 36 of cylindrical pipe 38, the balls 28 are forced to move radially outwardly of the races 40 provided therefor between the pressure plate 18, spacing sleeve 16 and base 14 into engagement with the inner surface 42 of pipe 38. An indication of the diameter of the interior of the pipe 38 is then given by comparison of the calibrations 44 on the dial 32 and the calibrations 82 on housing 12.

Figure 3:
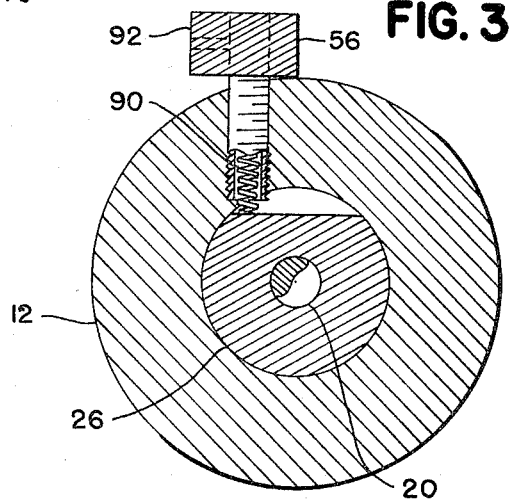
FIGURE 3 is a cross section view of the gage structure of FIGURE 1 taken on the line 3—3 in FIGURE 1.
Figure 4:
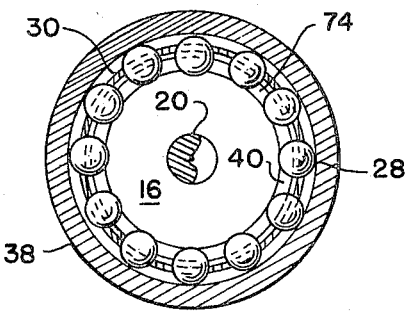
FIGURE 4 is a cross section view of the gage structure of FIGURE 1 taken on the line 4—4 in FIGURE 1.

More specifically the housing 12 is a cylindrical member having a stepped opening 46 extending axially therethrough including larger, intermediate and smaller diameter portions 48, 50 and 52, respectively. Housing 12 further includes the threaded opening 54 extending therethrough, as shown in FIGURE 3, to receive the adjustable biasing means 56 of the anti-backlash structure 24 of the gage 10. Housing 12 further includes the threaded openings 58 therein for receiving the bolts 60 which secure the base 14 to the housing 12.

Base 14 is circular and generally hat-shaped in cross section as illustrated best in FIGURE 1. The base 14 includes the flanges 62 fitting within the larger diameter portion 48 of the axial opening 46 through housing member 12 and secured therein by the bolts 60 which are passed through openings 64 in flanges 62. The recess 66 is provided in base 14 in which the hub 68 of the nut 25 is positioned.

Further the base 14 is provided with the exactly beveled annular end surface 70 extending therearound forming one side of one race 40 for balls 28.

The spacing sleeve 16 is cylindrical and includes the opening 72 extending axially therethrough, as shown best in FIGURE 1, through which the shaft 20 passes. The opposite ends of the sleeve 16 are provided with bevelled surfaces 74 and 76, respectively, which again form sides of the two ball races 40.

The retaining sleeve 30 is cylindrical and open at both ends, as shown in FIGURE 1. The angularly spaced radially extending openings 81 are provided in sleeve 30 opposite ball recess 40 into which balls 28 extend. Openings 81 are of smaller diameter than balls 28 and serve to angularly space balls 28 while permitting limited radial movement thereof.

Pressure plate 18, as previously indicated, is rigidly secured to shaft 20 and is positioned outwardly of the sleeve 16 with respect to the base 14. As previously indicated, shaft 20 extends through sleeve 16 and the nuts 25 and 26 of the anti-backlash structure 24 in housing 12 and includes the dial 32 escured to the helical end 22 thereof by convenient means, such as set-screw 80. Dial 32 includes calibrations 44 thereon which in conjunction with the calibrations 82 on the housing 12 provide an indication of the amount of rotation of dial 32 with respect to a predetermined starting point. The pressure plate 18 also includes the beveled surface 84 which again forms one surface of a ball race 40 between a pressure plate 18 and spacer 16.

The anti-backlash structure 24 includes the two nuts 25 and 26 previously indicated which are provided with a helical passage therethrough, through which the helical portion 22 of shaft 20 extends. The helical passage through nuts 25 and 26 may be electrically machined using the shaft 20 as an electrode to produce a close fit between shaft 20 and nuts 25 and 26.

Nut 25 is held against rotation relative to base 14 by means of mating flat surfaces 86 and 88 in the recess 66 in base member 14 and on the hub 68 of nut 25, respectively. Nut 26 is rotatable with respect to both the housing 12 and the shaft 22.

In operation the nut 26 is urged into engagement with the nut 25 by the bias applied thereto by the adjustable bias structure 56 including off-center bolt 92 and spring 90. Backlash during adjustment of the shaft 20 may be substantially eliminated by use of the nuts 25 and 26 in conjunction with the biasing spring 90 and bolt 92 of the adjustable biasing means 56.

In over-all opertaion, when it is desired to measure the inner diameter of pipe 38, the end 34 of gage 10 is inserted within the end 36 of pipe 38 and the dial 32 is rotated to move the shaft 20 axially in the direction of dial 32 through nuts 25 and 26, which as indicated above prevent error due to backlash during the measuring operation.

Movement of the shaft 22 toward the end thereof on which the dial 32 is secured will move the balls 28 radially outwardly in their races 40 an amount related to the rotation of dial 32 depending upon the pitch of the helix on portion 22 of shaft 20 and the angle of the bevel on the surfaces 70, 74, 76 and 84 of the races 40. Rotation of the dial 32 is stopped when the balls 28 engage the inner surface of the pipe 38, after which the internal diameter of the pipe 38 may be read from the calibrations 44 and 82 which, if desired, may read directly in terms of pipe internal diameter.

It will be particularly noted that the helical openings through the nuts 25 and 26 and the helical portion of the shaft 20 in contrast to threaded openings and shafts permit rapid movement of the shaft through the nuts so that adjustment of the gage 10 is faster.

It will also be noted that due to the plurality of races 40 provided with gage 10 that self-centering of the gage 10 against insertion of the gage in the pipe at an angle is provided. Further the gage is automatically centered with respect to the transverse diameter of the pipe due to the automatic adjusting of the position of the individual balls 28 in operation.

Thus it will be seen that a simple, economical and efficient gage is provided for determining the internal diameter of pipes, holes and the like which includes unique anti-backlash structure.

A plurality of modifications of the invention are contemplated. For example, a number of spacing sleeves 16 may be provided and a race 40 and balls 28 provided between each of the spacing members if more contact points between the pipe and gage 10 are desired. Also, it will be evident that other anti-backlash structure may be used in conjunction with the gage 10 and that the specific anti-backlash structure illustrated may be used in other devices, such as vises wherein fast, accurate movement between specific dimensions with positive stops is desired. It is the intention to include all such structures as are defined by the appended claims within the scope of the invention.

What I claim as my invention is:

1. A gage for measuring the internal diameter of cylindrical openings comprising generally cylindrical body means having a helical opening extending axially therethrough, a generally cylindrical pressure plate, a shaft secured to the pressure plate depending from one side thereof centrally thereof and having a helical portion passing through the opening in the body means, opposed beveled edges on the body means and pressure plate forming a ball race therebetween, balls positioned in said ball race, a retaining sleeve surrounding the balls for preventing outward radial movement of the balls beyond a predetermined diameter having openings therein through which the balls extend with diameters smaller than that of the balls, means for rotating the shaft relative to the body means to move the shaft axially in the helical opening in the body means whereby on movement of the beveled edges closer together the balls are moved radially outward and means operable between the body means and the shaft for indicating the radial position of diametrically opposed balls relative to each other in accordance with the relative rotation of the shaft and body means.

2. Structure as set forth in claim 1 and further including a cylindrical sleeve sleeved over the shaft between the body member and pressure plate having beveled edges on the opposite ends thereof forming a pair of ball races with the beveled edges on the pressure plate and body member and wherein the balls are provided in both races and the retaining sleeve prevents outward radial movement of the balls in both races beyond the predetermined diameter.

3. Structure comprising body means, a pair of members having aligned helical openings therethrough positioned in said body means one of said members being rotatable within said body means, means for restraining the other of the members against rotation relative to the body means and a shaft having a helical portion extending through said body means and the helical openings through said members.

4. Structure as set forth in claim 3 and further including adjustable resilient means carried by the body member engageable with the said one of said members for urging the one member into engagement with the other member about the helical portion of said shaft.

5. A gage for measuring the internal diameter of cylindrical openings comprising generally cylindrical body means having a helical opening extending axially therethrough, a generally cylindrical pressure plate, a shaft secured to the pressure plate depending from one side thereof centrally thereof and having a helical portion passing through the opening in the body means, opposed beveled edges on the body means and pressure plate forming a ball race therebetween, balls positioned in said ball race, a retaining sleeve surrounding the balls for preventing outward radial movement of the balls beyond a predetermined diameter having openings therein through which the balls extend with diameters smaller than that of the balls, means for rotating the shaft relative to the body means to move the shaft axially in the helical opening in the body means whereby on movement of the beveled edges closer together the balls are moved radially outward, means operable between the body means and the shaft for indicating the radial position of diametrically opposed balls relative to each other in accordance with the relative rotation of the shaft and body member and anti-backlash means carried by the body means for preventing backlash between the body means and shaft.

6. Structure as set forth in claim 5 wherein the anti-backlash means comprises a pair of members positioned in said body means through which the helical openings extend one of which members is rotatable within said body means, means for restraining the other of the members against rotation relative to the body means and adjustable resilient means carried by the body member and engaged with the said one of said members for urging the one member about the helical portion of said shaft into engagement with the other member.

7. Structure as set forth in claim 5 and further including a cylindrical sleeve sleeved over the shaft between the body member and pressure plate having beveled edges on the opposite ends thereof forming a pair of ball races with the beveled edges on the pressure plate and body member and wherein the balls are provided in both races and the retaining sleeve prevents outward radial movement of the balls in both races beyond the predetermined diameter.

8. A gage for measuring the internal diameter of cylindrical openings comprising a cylindrical housing having an axial opening extending therethrough including a radially reduced portion at one end and a radially enlarged portion at the other end of the housing, a first nut member positioned in the opening having a reduced diameter portion extending into the reduced diameter portion of the opening, a second nut member positioned in said opening having a reduced diameter portion extending into the enlarged diameter portion of the opening, a base member having a radially enlarged flange at one end thereof fitting within the enlarged diameter portion of the opening through said housing and a recess within the one end thereof receiving the reduced diameter portion of the second nut member and a beveled edge around the other end thereof, means securing the base member to the body member against relative rotation and axial movement said second nut member and base member having engaging surfaces for preventing relative rotation therebetween, an opening extending through the base member axially of the housing and a helical opening through the nut members aligned with the opening through the base member, a shaft having a helical portion extending through the opening in the base member and through the aligned helical openings in the nut members, an adjusting screw extending transversely through the housing and off center relative to the helical opening through the one nut member, spring means operable between the adjusting screw and one nut member for urging the one nut member about the helical portion of the shaft into engagement with the other nut member to prevent backlash between the nut members and shaft, a cylindrical sleeve positioned over the shaft outwardly of the base member relative to the housing having a beveled edge at each end thereof, a pressure plate rigidly secured to the shaft outwardly of the sleeve relative to the base member having a beveled edge adjacent the sleeve, said beveled edges on the base and one end of the sleeve and on the other end of the sleeve and the pressure plate forming a pair of ball races spaced axially of the shaft, balls positioned within the ball races, a retaining sleeve positioned over the sleeve and having radial openings therein through which the balls may extend radially which openings have a smaller diameter than the balls for retaining the balls in the races, means secured to the other end of the shaft for rotating the shaft relative to the nut members and means operable between the housing and means for rotating the shaft for indicating the relative radial position of diametrically opposed balls.

References Cited by the Examiner

UNITED STATES PATENTS

| | | | |
|---|---|---|---|
| 1,440,080 | 12/1922 | Hubbell | 33—164 |
| 2,587,560 | 2/1952 | Widmer | 151—15 |
| 2,665,496 | 1/1954 | Wynne | 33—178 |
| 2,766,532 | 10/1956 | Eisele | 33—178 X |
| 2,849,801 | 9/1958 | Kustusch | 33—178 |
| 2,856,694 | 10/1958 | Bianco | 33—164 |
| 3,100,117 | 8/1963 | Schneider et al. | 33—174 X |

FOREIGN PATENTS 276,212  7/1914  Germany.

OTHER REFERENCES

Product Engineering, April 29, 1963, volume 4, Number 9, pages 44 and 45.

LEONARD FORMAN, *Primary Examiner.*

S. S. MATTHEWS, *Assistant Examiner.*